United States Patent
Burton

[11] Patent Number: 6,050,712
[45] Date of Patent: Apr. 18, 2000

[54] NON-READJUSTABLE HEADLAMP ADJUSTER

[76] Inventor: John E. Burton, 707 W. Court St., Ludington, Mich. 49431

[21] Appl. No.: 09/163,887

[22] Filed: Sep. 30, 1998

[51] Int. Cl.[7] .................. F21W 101/100; F21V 14/00
[52] U.S. Cl. ................. 362/529; 362/284; 362/289; 362/324
[58] Field of Search .................. 362/524, 528, 362/529, 324, 284, 289

[56] References Cited

U.S. PATENT DOCUMENTS

| | | | |
|---|---|---|---|
| 4,674,018 | 6/1987 | Ryder et al. | 362/424 |
| 4,703,399 | 10/1987 | Van Duyn et al. | 362/66 |
| 4,713,739 | 12/1987 | Ryder et al. | 362/424 |
| 4,796,494 | 1/1989 | Eckenrode et al. | 81/428 |
| 4,930,367 | 6/1990 | Nagasawa | 74/416 |
| 4,939,945 | 7/1990 | Ryder et al. | 74/89.13 |
| 4,965,706 | 10/1990 | Reiland | 362/66 |
| 5,079,685 | 1/1992 | Osborn | 362/421 |
| 5,161,877 | 11/1992 | Wright et al. | 362/66 |
| 5,163,746 | 11/1992 | Lisak | 362/66 |
| 5,165,775 | 11/1992 | Lisak et al. | 362/66 |
| 5,186,531 | 2/1993 | Ryder et al. | 362/66 |
| 5,186,532 | 2/1993 | Ryder et al. | 362/66 |
| 5,197,799 | 3/1993 | Dehaene | 362/289 X |
| 5,214,971 | 6/1993 | Burton et al. | 74/89.13 |
| 5,351,170 | 9/1994 | Nagengast et al. | 362/66 |
| 5,390,098 | 2/1995 | Reiland | 362/421 |
| 5,429,011 | 7/1995 | Stevenson | 74/89.13 |
| 5,446,632 | 8/1995 | Childs et al. | 362/69 |
| 5,483,426 | 1/1996 | Lewis et al. | 362/66 |
| 5,539,625 | 7/1996 | Turley, Jr. et al. | 362/66 |
| 5,622,421 | 4/1997 | Turley, Jr. et al. | 362/66 |
| 5,707,133 | 1/1998 | Burton | 362/66 |
| 5,707,134 | 1/1998 | Nishizawa | 362/66 |
| 5,709,452 | 1/1998 | Bertling et al. | 362/66 |
| 5,741,059 | 4/1998 | Kusagaya | 362/524 |
| 5,775,795 | 7/1998 | Christian et al. | 362/66 |
| 5,779,343 | 7/1998 | Denley | 362/66 |
| 5,951,157 | 9/1999 | Shirai et al. | 362/284 X |

*Primary Examiner*—Laura K. Tso
*Attorney, Agent, or Firm*—Brian G. Gilpin; Godfrey & Kahn, S.C.

[57] ABSTRACT

Each horizontal adjuster mechanism used in connection with low beam headlamps must be either non-readjustable after the initial adjustment or equipped with a non-recalibratable vehicle headlamp aiming device (VHAD) which is set to zero when the vehicle leaves the factory. Vehicle manufacturers must either aim the lamps and provide a non-recalibratable VHAD which is properly zeroed or aim the lamps and provide a mechanism to prevent future readjustment. A headlamp adjuster may be rendered non-readjustable after the headlamp has been aimed by snapping down a snap-socket, placing a covering cap over the drive shaft, closing a one-way lid on a drive shaft cover, or by otherwise preventing rotation of the drive shaft.

15 Claims, 6 Drawing Sheets

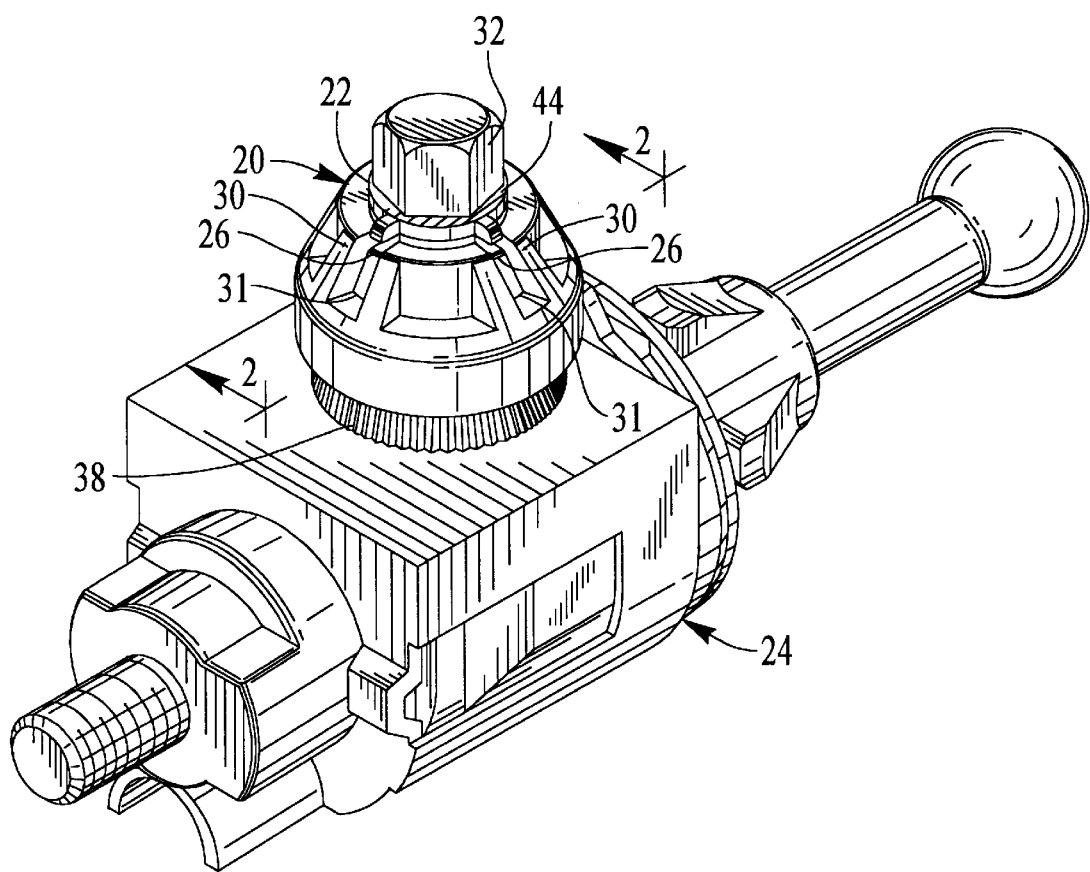
FIG_1

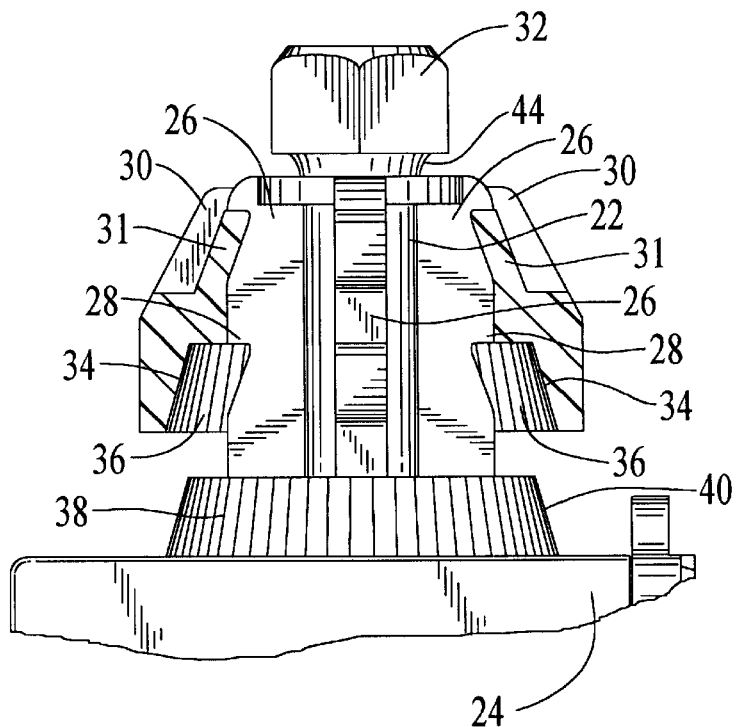
FIG_2
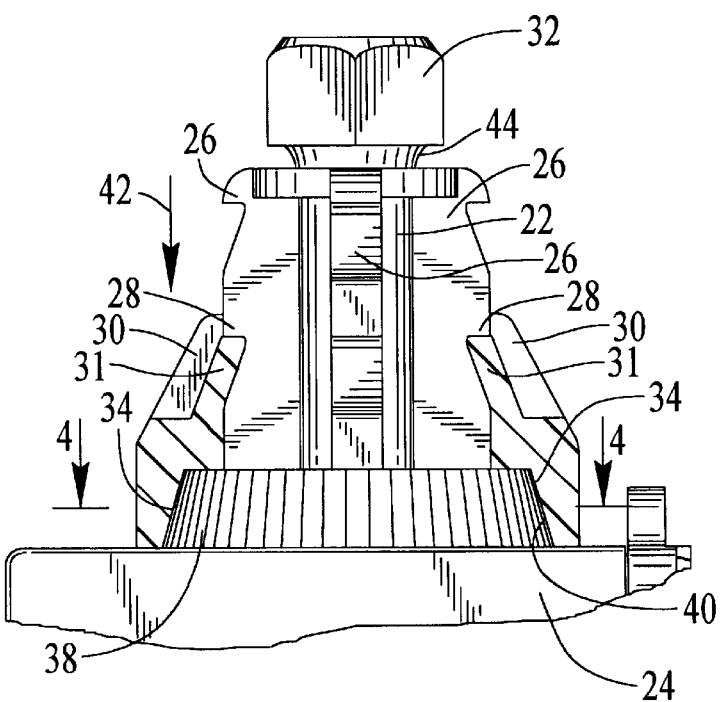
FIG_3

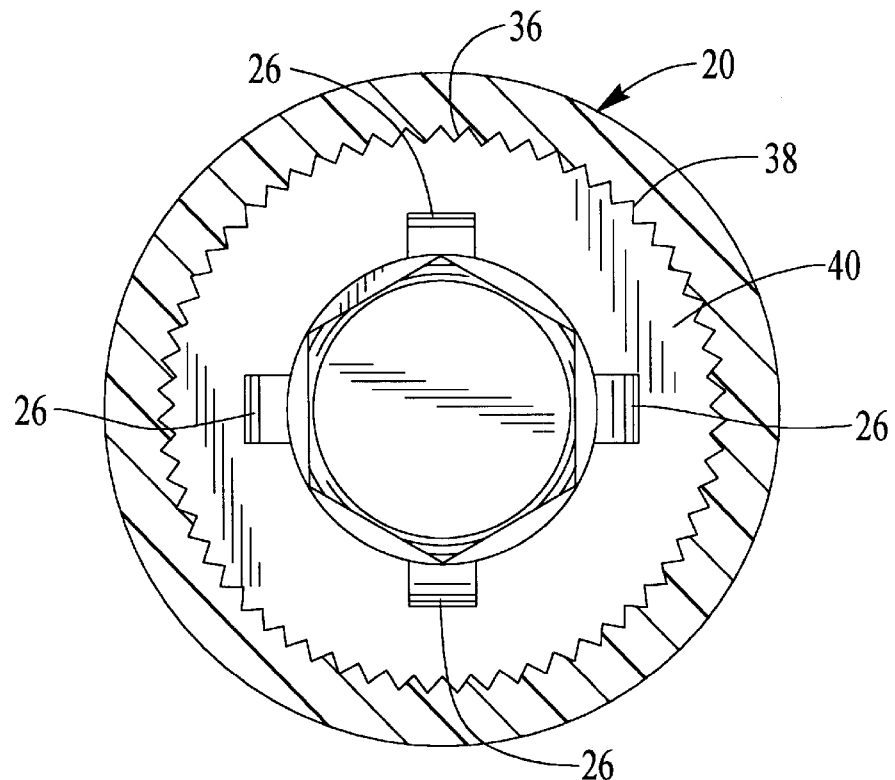
FIG_4
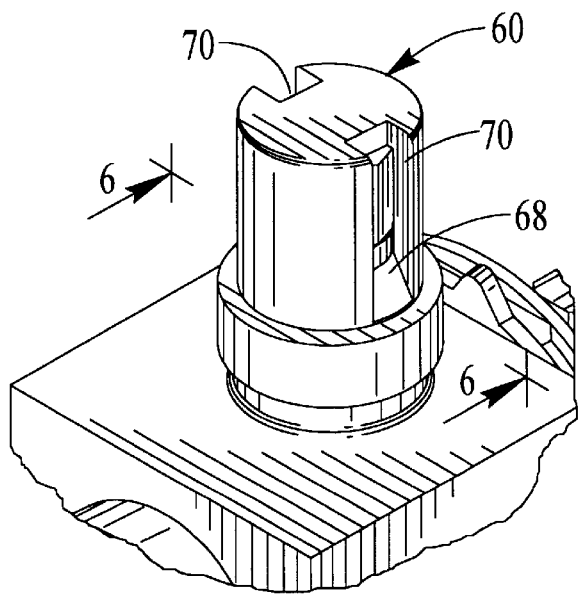
FIG_5

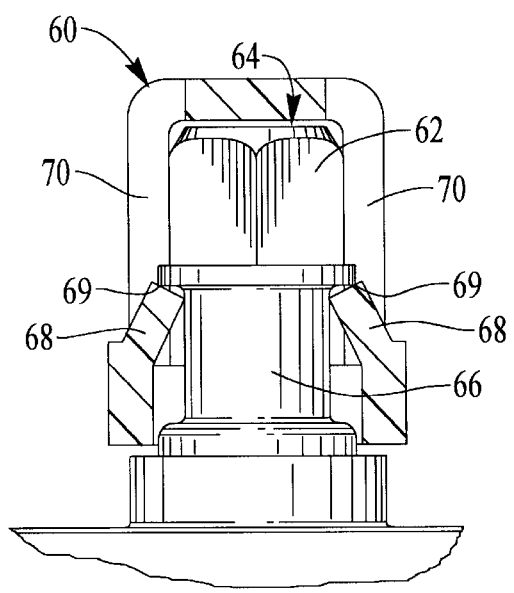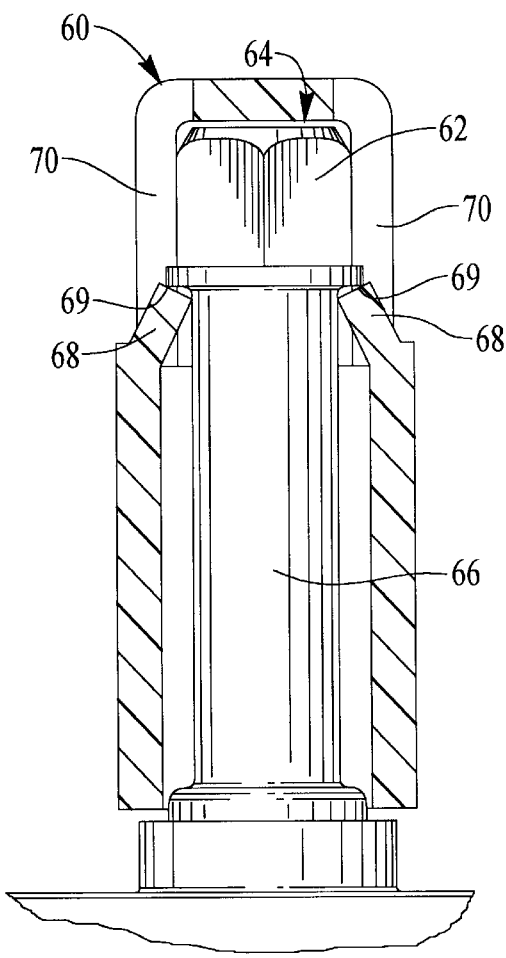

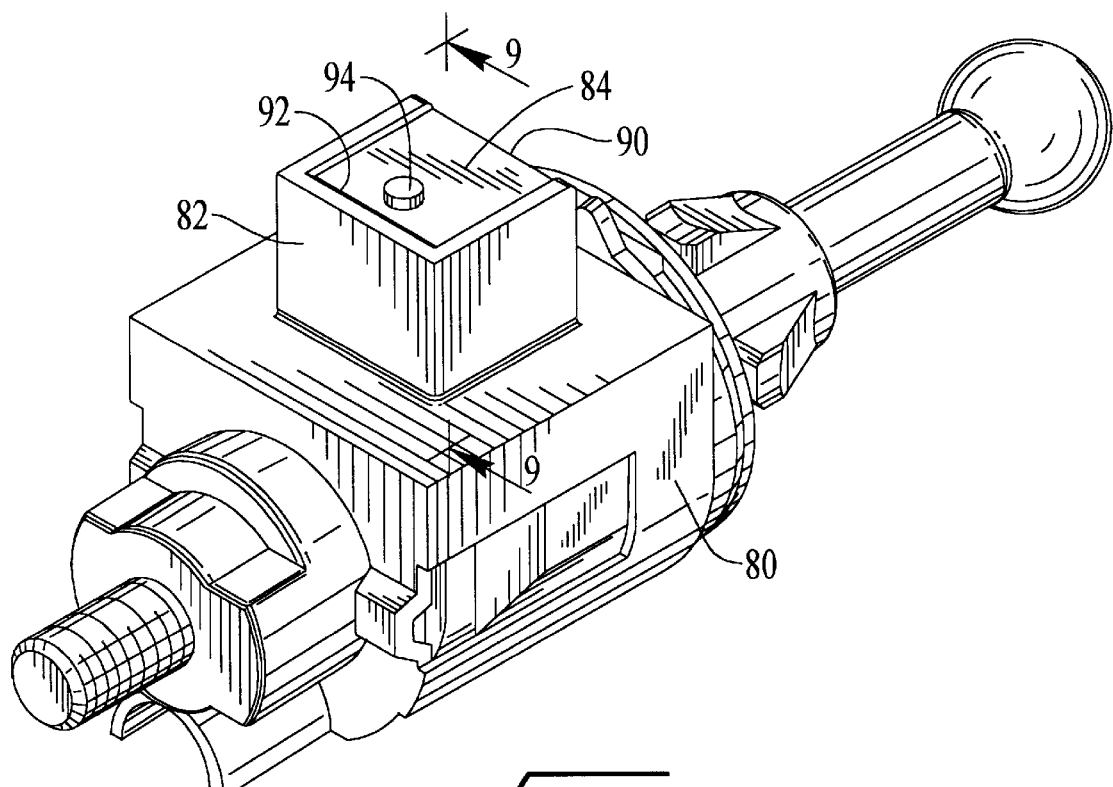
FIG_8
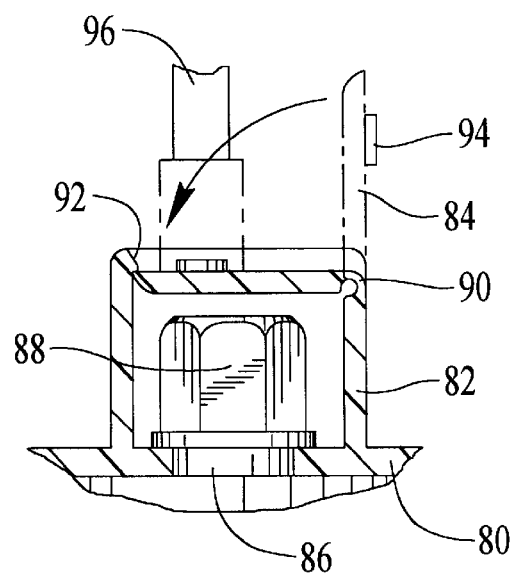
FIG_9

NON-READJUSTABLE HEADLAMP ADJUSTER

FIELD OF THE INVENTION

This invention relates generally to headlamp adjusters and more particularly to headlamp adjusters which may be rendered non-readjustable after the headlamp has been installed and properly aimed.

BACKGROUND OF THE INVENTION

There is a growing trend in the automobile industry to use internally adjustable reflector headlamps. Internally adjustable reflector headlamps include a reflector and bulb socket assembly enclosed within a sealed headlamp housing and lens. The orientation of the reflector within the housing is adjustable to control the direction of the light beam cast by the headlamp. Typically, the adjustable reflector is supported by three ball studs that extend from the rear of the headlamp housing and fit within sockets located in three corners of the reflector. The middle ball stud is secured directly to the headlamp housing to provide a fixed pivot point for the reflector. The other two ball studs are connected to a pair adjuster mechanisms secured to the rear of the headlamp housing. By operating the adjuster mechanisms, these two ball studs can be extended and retracted to control the horizontal and vertical orientation of the reflector. Examples of such adjusters include those disclosed in U.S. Pat. Nos. 5,707,133 and 5,214,971 to Burton et al., U.S. Pat. No. 5,483,426 to Lewis et al., U.S. Pat. No. 4,796,494 to Eckenrode et al., and U.S. Pat. No. 4,703,399 to Van Duyn et al.

Recent changes in the United States National Highway Traffic Safety Administration (NHTSA) standards require that if a horizontal adjuster mechanism is used in connection with an internally adjustable reflector headlamp, it must be either non-readjustable after the proper aim has been achieved or be equipped with a non-recalibratable vehicle headlamp aiming device (VHAD) which is set to zero after the proper aim has been achieved. Previously, recalibration of the VHAD was allowable under the NHTSA standards. As such, vehicle manufacturers must either aim the lamps and provide a non-recalibratable VHAD which is properly zeroed or aim the lamps and provide a mechanism to prevent future readjustment. Examples of adjusters which include VHADs that can be recalibrated are disclosed in U.S. Pat. Nos. 5,622,421 and 5,539,625 to Turley, Jr. et al. and U.S. Pat. No. 5,446,632 to Childs et al. However, because of the change in NHTSA standards, the devices disclosed in the above patents can no longer be used in the manner indicated.

One attempt at a design of a mechanism to prevent readjustment (shown in FIGS. 5A and 5B) employs an undercut cap 400 with an interior rim portion 402 that is a smaller diameter ("undercut") than the diameter of the head 404 on the end of the drive shaft 406. However in order for an adjuster to become truly non-readjustable using a cap, the cap must not be easily removed. To create a difficult to remove undercut cap 400, the engagement between the interior rim portion 402 and the head 404 must be such that the interference is very high. Because of the nature of the undercut engagement in this design, the force required to remove the cap 400 after it has been installed is about the same as the force required to install the cap 400. As such, in order to be effective, the undercut cap 400 would be very difficult to install and thus not efficient to assemble.

Accordingly, a need exists for a horizontal headlamp adjuster that may easily be rendered non-readjustable after the lamp has been properly aimed at the factory, conforms to the new NHTSA standards, is cost effective to assemble, and is easily installed.

SUMMARY OF THE INVENTION

Therefore, it is an object of the present invention to provide a horizontal headlamp adjuster that may easily be rendered non-readjustable after the headlamp has been aimed at the factory. It is a further object of the invention to provide a horizontal headlamp adjuster that meets the NHTSA standards. It is an additional object of the invention to provide a horizontal headlamp adjuster that does not require cumbersome additions to a conventional adjuster. It is yet another object of the invention to provide a horizontal headlamp adjuster that is cost effective to assemble and can be efficiently and economically handled in the headlamp or vehicle assembly process. It is still a further object of the present invention to provide a horizontal headlamp adjuster that overcomes the disadvantages of the prior art.

As described in more detail below and shown in the accompanying drawings, the non-readjustable headlamp adjuster of the present invention includes a conventional headlamp adjuster that can be rendered non-adjustable after the headlamp has been aimed by preventing manipulation of the drive shaft. In accordance with the present invention, this is preferably accomplished by closing a snap-socket, placing a covering cap over the drive shaft, or closing a one-way lid on a drive shaft cover. One or more of these embodiments may be best suited for use in a particular application. For example, while any of the disclosed embodiments may be used, the covering cap embodiment is particularly suitable for use with relatively long adjustment shafts and in confined areas.

The snap-socket embodiment of the present invention includes a plastic snap-socket disposed about an adjuster drive shaft. The drive shaft has a number of tabs with catch holds or ramp locks extending therefrom. The tabs engage the snap-socket in a series of slots which correspond to the tabs. The snap-socket has a tapered interior rim portion with a series of splines. The adjuster may be any of a number of conventional adjusters with the addition of a series of tapered splines on a raised portion thereof that correspond to the splined portion of the snap-socket. The snap-socket is placed over the head of the drive shaft and the catch holds retain the snap-socket in a disengaged position during adjustment of the headlamp. As such, rotation of the drive shaft causes a corresponding rotation of the snap-socket. When the adjustment has been completed the snap-socket is pushed over the catch holds such that the splined interior rim portion of the snap-socket is forced to remain in an engaged position with the spline portion of the adjuster housing. The snap-socket may be pushed over the catch holds using the installer's fingers, a long socket, a tube, or other such device. When the splined interior rim portion of the snap-socket is engaged with the splined portion of the raised shoulder of the adjuster housing, the drive shaft is prevented from being rotated because the tabs extending from the drive shaft remain engaged with the slots formed within the snap-socket. If a forced adjustment is attempted, the engagement between the two splined pieces prevents rotation of the drive shaft and the drive shaft will fail at a weakened neck portion so that readjustment cannot be effectuated if a sufficient degree of force is used. As such, once the snap-socket has been snapped into place, the headlamp is not readjustable.

In another embodiment of the present invention, a covering cap is provided which is snap-fitted over the drive shaft after the headlamp has been properly aimed. The drive shaft of this embodiment includes a head portion with a diameter larger than that of the main portion of the shaft. The covering cap includes retaining tabs which deflect to effectuate the snap-fit over the head of the drive shaft and engage the underside of the head so as to retain the covering cap so that it may not be removed without destroying the covering cap. It has been found most effective to provide a covering cap with two retaining tabs extending inwardly from the cap so that the cap has two detent portions. Once the covering cap has been snapped into place, the headlamp adjuster cannot be readjusted because the head cannot be engaged to cause rotation of the drive shaft using the conventional means used to effectuate the initial adjustment, e.g., a Torx®, octagonal, or Phillips head driver. Further, the covering cap must be destroyed or significantly damaged to remove it from the head of the drive shaft. The covering cap of the present invention is preferably molded using conventional two-plate injection molding processes that do not include expensive side action in the molding process. A such, the covering cap of the present invention is an effective and cost-efficient design.

In another embodiment of the present invention, the adjuster housing includes an enclosure having a one-way closing hinged lid extending from the housing so as to substantially enclose the drive shaft. Preferably, the hinge is a living hinge biased toward the open position so as to prevent inadvertent closing of the lid. Opposite the hinge side of the enclosure is a one-way snap which retains the lid upon closing. The lid may include a post extending therefrom to provide a convenient place for engaging and closing the lid using the same socket or driver which was used to rotate the drive shaft end effectuate adjustment of the headlamp. After the headlamp has been properly adjusted, the lid is snapped closed and engages the one-way snap so that it cannot be reopened without damaging or destroying the enclosure or lid. As such, the adjuster is not readjustable after the lid has been closed.

The present invention can be used with any number of headlamp adjusters including right angle gear style adjusters, e.g., U.S. Pat. Nos. 5,214,971 and 5,707,133 to Burton et al.; cam style adjusters, e.g., U.S. Pat. No. 4,965,706 to Reiland; coil spring style adjusters, e.g., U.S. Pat. No. 5,079,685 to Osborn; scroll style adjusters, e.g., U.S. Pat. No. 5,186,532 to Ryder et al.; and screw style adjusters, e.g., U.S. Pat. No. 5,707,134 to Nishizawa. As such, the terms "adjuster," "headlamp adjuster," and variations thereof used herein should be interpreted as being inclusive of any of the wide variety of adjustment devices possible. Similarly, the terms "drive shaft," "shaft," and variations thereof should be interpreted as being inclusive of any adjuster shaft that is rotated to effectuate adjustment of the aim of the reflector.

In sum, the present invention represents a significant improvement over the prior art in many ways. The non-readjustable headlamp adjusters in accordance with the present invention are easily rendered non-readjustable after the lamp has been properly aimed at the factory, conform to new NHTSA standards, do not require expensive or cumbersome additions to a conventional adjuster, are cost effective to assemble, and are efficiently and economically handled in the headlamp or vehicle assembly process. These and other objects and advantages of the present invention will become apparent from the detailed description and accompanying drawings.

BRIEF DESCRIPTION OF THE DRAWINGS

FIG. 1 is a perspective view of a non-readjustable headlamp adjuster in accordance with one embodiment of the present invention;

FIG. 2 is a partial cross-sectional view of the non-readjustable headlamp adjuster of FIG. 1, taken generally along the line 2—2 in FIG. 1, the snap-socket being in the disengaged position;

FIG. 3 is a partial cross-sectional view of the non-readjustable headlamp adjuster of FIG. 1, taken generally along the line 2—2 in FIG. 1, the snap-socket being in the engaged position;

FIG. 4 is a partial cross-sectional view of the non-readjustable headlamp adjuster of FIG. 3, taken generally along the line 4—4 in FIG. 3;

FIG. 5 is a perspective view of a non-readjustable headlamp adjuster in accordance with another embodiment of the present invention;

FIG. 6 is a partial cross-sectional view of the non-readjustable headlamp adjuster of FIG. 5, taken generally along line 6—6 in FIG. 5;

FIG. 7 is a partial cross-sectional view of a non-readjustable headlamp adjuster in accordance with the alternative embodiment of the present invention of FIG. 6, the drive shaft being substantially longer than in the embodiment shown in FIG. 6;

FIG. 8 is a perspective view of a non-readjustable headlamp adjuster in accordance with another embodiment of the present invention; and FIG. 9 is a partial cross-sectional view of the non-readjustable headlamp adjuster of FIG. 8, taken generally along the line 9—9 in FIG. 8.

DETAILED DESCRIPTION OF THE PREFERRED EMBODIMENTS

Figure 5A:
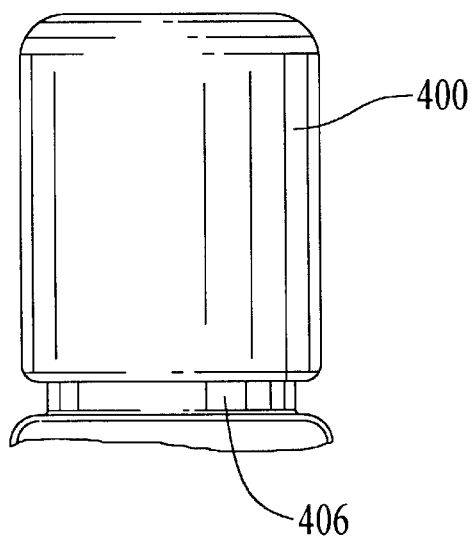
FIG. 5A is a perspective view of an attempted design for a non-readjustable headlamp adjuster.

Referring now to FIGS. 1 and 2, the snap-socket embodiment of the present invention includes a snap-socket 20 disposed about an adjuster drive shaft 22 on a modified conventional adjuster housing 24. The drive shaft 22 preferably is configured so that it has a number of tabs 26 with catch holds 28 or ramp locks extending therefrom. The tabs 26 engage the snap-socket 20 through a series of slots 30 which correspond to the tabs 26. The slots 30 have detents 31 which extend inwardly toward the drive shaft 22. As best shown in FIGS. 2 and 3 the snap-socket 20 has a tapered interior rim portion 34 with a series of splines 36. The adjuster may be any of a number of conventional adjusters which are modified to incorporate a series of tapered splines 38 on a raised shoulder 40 on the housing 24 thereof that correspond to the splines 36 of the tapered interior rim portion 34 of the snap-socket 20. The catch holds 28 retain the snap-socket 20 in a disengaged position during adjustment of the headlamp caused by rotation of the head 32 of the drive shaft 22 such that the snap-socket 20 rotates with the drive shaft 22.

When the aiming of the headlamp has been completed, the snap-socket 20 is pushed over the catch holds 28 as indicated by arrow 42 in FIG. 3 such that the splined interior rim portion 34 of the snap-socket 20 is forced to remain in an engaged position with the spline portion 38 of the raised portion 40 of the adjuster housing 24 (FIG. 4). This engagement is effectuated because the detents 31 in the slots 30 of the snap-socket 20 engage the bottom of the catch holds 28. The snap-socket 20 may be pushed over the catch holds 28 using the installer's fingers, a long socket, a tube or other such device. When the splined interior rim portion 34 of the snap-socket 20 is engaged with the splined portion 38 of the raised shoulder 40 of the adjuster housing 24, the drive shaft 22 is prevented from being rotated because the tabs 26 extending from the drive shaft 22 remain engaged within the slots 30 formed within the snap-socket 20. If a forced adjustment is attempted, the drive shaft 22 will fail at a weakened neck portion 44 so that readjustment cannot be effectuated. As such, once the snap-socket 22 has been snapped into place in the engaged position, the headlamp is not readjustable.

The snap-socket 20 is preferably formed from plastic, however other suitable materials having sufficiently resilient characteristics to effectuate the snap from the disengaged position (FIG. 2) to the engaged position (FIG. 3) may be used. Preferably, the snap-socket 20 is injection molded using a two-plate process that does not require complicated and expensive undercutting or side-action. The use of four tabs 26 extending from the drive shaft 22 has been found to be an effective and cost-efficient design which provides the drive shaft 22 with sufficient strength and, of course, a corresponding number of slots 30 are provided in the snap-socket 20. Typically, the drive shaft 22 is die-cast from zinc materials as is conventional in the art but other processes and materials could be used. Fifty splines 38 on the raised shoulder 40 of the housing 24 and a corresponding fifty splines on the tapered interior rim portion 34 of the snap-socket 20 has been found effective although other numbers could be used and still meet the basic objectives of the invention. Fifty splines is effective because it allows a strong rotation-resistant interface between the tapered rim portion 34 of the snap-socket 20 and the raised shoulder 40, is easily molded in the two interfacing parts, and allows the locking engagement to be achieved with minimal repositioning of the drive shaft 22 after the proper headlamp adjustment has been made.

Figure 5B:
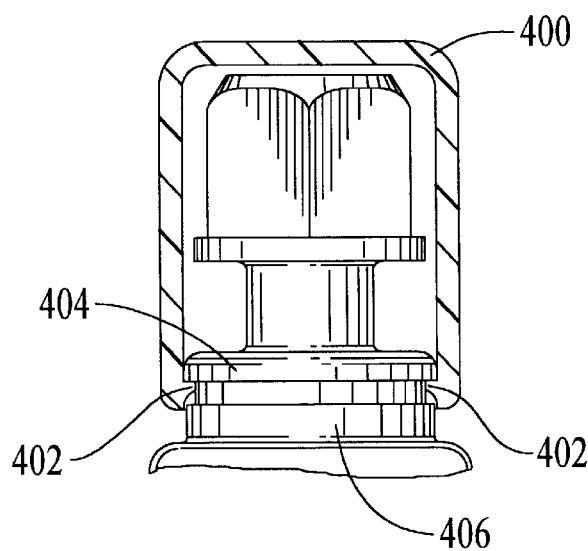
FIG. 5B is a partial cross-sectional view of the attempted design for a non-readjustable headlamp adjuster of FIG. 5A

Referring now to FIGS. 5, 6, and 7, in another embodiment of the present invention, a covering cap 60 is provided which is snap-fitted over the head 62 of the drive shaft 64 after the headlamp has been properly aimed. The drive shaft 64 of this embodiment includes a head 62 with a diameter larger than that of the main portion 66 of the shaft 64. Such a head 62 is typically found on certain models of headlamp adjuster. The covering cap 60 includes deflecting retaining tabs 68 which effectuate the snap-fit over the head 62 of the drive shaft 64 and retain the covering cap 60 so that it may not be removed without destroying the covering cap 60. This retention is accomplished by the retaining tabs 68 engaging the underside 69 of the head 62 of the drive shaft 64. It has been found most effective to provide a covering cap 60 with two retaining tabs 68 extending inwardly from the cap 60 so that the cap 60 has two detent portions 70, however other numbers may be used. Once the covering cap 60 has been snapped into place, the headlamp adjuster cannot be readjusted. Because of its unique shape and design, the covering cap 60 of the present invention can be easily molded using conventional injection molding processes that do not include an undercut. An undercut typically requires side action in the molding process. When the covering cap 60 of the present invention is disposed over the head 62 of the drive shaft 64, the head 62 cannot be engaged to cause rotation of the drive shaft 64 using the conventional means used to effectuate the initial adjustment, e.g., a Torx®, octagonal, or Phillips head driver. Further, because of the one-way snapping engagement of the tabs 68 with the underside 69 of the head 62 of the shaft 64, the covering cap 60 must be destroyed or significantly damaged in order to remove it from the head 62 of the drive shaft 64. As such, the covering cap 60 of the present invention is an effective and cost-efficient design.

The covering cap is preferably formed from injection molded plastic, however other manufacturing processes and materials having suitably resilient characteristics to effectuate the snapping over the head 62 of the drive shaft 64 could be used. Preferably, the covering cap 60 is designed so that it may be injection molded using a conventional two-plate molding process that does not require complicated and expensive undercutting or side-action. The covering caps 60 shown in FIGS. 5, 6, and 7 are one such design.

Referring now to FIGS. 8 and 9, in another embodiment of the present invention, an adjuster housing 80 is modified to include a drive shaft enclosure 82 with a one-way closing hinged lid 84, shown in the closed position in FIGS. 8 and 9 and in phantom, in the open position, in FIG. 9. The adjuster housing 80 has the drive shaft enclosure 82 extending therefrom so as to enclose the drive shaft 86 and the drive shaft head 88. The top of the enclosure 80 has a one-way closing hinged lid 84 extending therefrom. Preferably, the hinge 90 is a living hinge biased toward the open position (shown in phantom in FIG. 9) so as to prevent inadvertent closing of the lid 84. Opposite the hinge side 90 of the enclosure 80 is a one-way snap 92 which retains the lid 84 upon closing. The lid 84 may include a socket post 94 extending therefrom to provide a convenient place for engaging and closing the lid 84 using the same socket 96 (shown in phantom) which was used to rotate the head 88 of the drive shaft 86 end effectuate adjustment of the headlamp. After the headlamp has been properly adjusted, the lid 84 is snapped closed and engages the one-way snap 92 so that the lid 84 cannot be reopened without damaging or destroying the enclosure 82, the lid 84, the hinge 90 or the one-way snap 92. As such, the adjuster is not readjustable after the lid 84 has been snapped closed.

Preferably, the enclosure 82 and lid 84 are integrally molded with the adjuster housing 80. As such, the enclosure 82 is formed from the same material as the adjuster housing 80, typically plastic. This embodiment may be used with adjusters having long drive shafts 86 but such use requires a correspondingly long enclosure 82 which may be cumbersome or expensive to mold integrally with the adjuster housing 80. As such, this embodiment is particularly effective when used in connection with a relatively short drive shaft 86. The length of the drive shaft 86 typically depends on the installation and spacing requirements within the headlamp.

As illustrated by the foregoing description and shown in the Figures, the present invention is more suitable as a non-readjustable headlamp adjuster than existing devices. The present invention overcomes the limitations and disadvantages of existing adjusters by providing a non-readjustable adjuster which may be rendered non-readjustable after the lamp has been properly aimed at the factory, is easily rendered non-readjustable in the factory, does not require expensive or cumbersome additions to a conventional adjuster, is cost effective to assemble, and is efficiently and economically handled in the headlamp or vehicle assembly process.

Although the invention has been herein shown and described in what is perceived to be the most practical and preferred embodiments, it is to be understood that the invention is not intended to be limited to those specific embodiments. Rather, it is recognized that modifications may be made by one of skill in the art without departing from the spirit or intent of the invention. Therefore, the invention is to be taken as including all reasonable equivalents to the subject matter of the appended claims.

I claim:

1. A non-readjustable headlamp adjuster comprising:
   a shaft extending from the adjuster, the shaft effectuating operation of the adjuster upon rotation thereof; and
   a snap-socket disposed about the shaft moveable from a non-engaged position to an engaged position and operable to interlock the adjuster and the shaft so as to prevent rotation of the shaft when the snap-socket is in the engaged position.

2. The non-readjustable headlamp adjuster of claim 1 further comprising:
   a raised shoulder on the adjuster, the shaft extending through the shoulder; and
   an interior rim in the snap-socket, the shoulder interfacing with the interior rim so as to prevent rotation of the snap-socket with respect to the shoulder when the snap-socket is in the engaged position.

3. The non-readjustable headlamp adjuster of claim 2 further comprising:
   a plurality of slots in the snap-socket; and
   a plurality of tabs extending from the shaft, the tabs on the shaft engaged in the slots in the snap-socket so as to prevent rotation of the snap-socket with respect to the shaft when the snap-socket is in the engaged position.

4. The non-readjustable headlamp adjuster of claim 3 wherein each of said plurality of tabs extending from the shaft has a catch hold, the catch holds supporting the snap-socket in the non-engaged position and securing the snap-socket in the engaged position after it has been moved thereto.

5. The non-readjustable headlamp adjuster of claim 4 wherein each of the plurality of slots in the snap-socket has a detent extending therefrom, the detents interfacing with the catch holds so as to initially support the snap-socket in the non-engaged position and to secure the snap-socket in the engaged position after it has been moved thereto.

6. The non-readjustable headlamp adjuster of claim 5 wherein the interior rim and the shoulder are splined so as to effectuate a non-rotatable interface between the snap-socket and the shoulder when the snap-socket is in the engaged position.

7. The non-readjustable headlamp adjuster of claim 6 wherein the shaft has a weakened portion, the weakened portion capable of failing upon an attempted forced rotation of the shaft when the snap-socket is secured in the engaged position.

8. The non-readjustable headlamp adjuster of claim 1 further comprising:
   a raised shoulder protruding from the adjuster, the shaft extending through the shoulder;
   a plurality of tabs protruding from the shaft; and
   a plurality of slots and an interior rim in the snap-socket, the interior rim capable of interfacing with the raised shoulder so as to prevent rotation of the snap-socket with respect to the shoulder, the plurality of tabs on the shaft engaging the plurality of slots in the snap-socket so as to prevent rotation of the snap-socket with respect to the shaft.

9. The non-readjustable headlamp adjuster of claim 8 wherein:
   at least one of the plurality of tabs protruding from the shaft has catch holds; and
   at least one of the plurality of slots in the snap-socket has detents, the detents interfacing with the catch holds so as to support the snap-socket in the non-engaged position during operation of the adjuster, the detents interfacing with the catch holds so as to secure the snap-socket in the engaged position after it has been moved thereto.

10. The non-readjustable headlamp adjuster of claim 9 wherein the interior rim portion and the shoulder are splined so as to effectuate a non-rotatable interface between the snap-socket and the shoulder when the snap-socket is in the engaged position.

11. The non-readjustable headlamp adjuster of claim 10 wherein the shaft has a weakened portion capable of failing upon an attempted forced rotation of the shaft when the snap-socket is in the engaged position.

12. The non-readjustable headlamp adjuster of claim 1 wherein the shaft has a weakened portion capable of failing upon an attempted forced rotation thereof when the snap-socket is in the engaged position.

13. A non-readjustable headlamp adjuster comprising:
   a splined shoulder juxtaposed relative to the adjuster;
   a drive shaft extending through the shoulder and into the adjuster, the drive shaft effectuating operation of the adjuster upon rotation thereof;
   a snap-socket disposed about the drive shaft, the snap-socket having a tapered interior rim with splines thereon, the snap-socket having at least one tab receiving means therein, each of the slots having a detent protruding inwardly therefrom, the snap-socket being moveable from a non-engaged position to an engaged position; and
   at least one tab extending from the drive shaft, the at least one tab corresponding to the at least one tab receiving means in the snap-socket, the at least one tab having catch holds capable of supporting the snap-socket in the non-engaged position and retaining the snap-socket in the engaged position after it has been moved into the engaged position.

14. The non-readjustable headlamp adjuster of claim 13 wherein the splines on the shoulder interface with the splines on the interior rim of the snap-socket so as to prevent rotation of the snap-socket with respect to the shoulder when the snap-socket is in the engaged position;
   wherein the at least one tab on the drive shaft engages the at least one tab receiving means in the snap-socket so as to prevent rotation of the snap-socket with respect to the drive shaft when the snap-socket is in the engaged position; and
   wherein the drive shaft has a weakened portion capable of failing upon an attempted forced rotation of the drive shaft when the snap-socket is in the engaged position.

15. A non-readjustable adjustment mechanism comprising:
   a drive shaft, the drive shaft effectuating operation of the adjustment mechanism upon rotation thereof by a driver;
   a head on the end of the drive shaft, the head being larger in diameter than the drive shaft so as to include an underside rim; and
   a covering cap having at least one retaining tab extending inwardly therefrom, the at least one retaining tab capable of engaging the underside rim of the head of the drive shaft and non-removably securing the covering cap over the head of the drive shaft, the head of the drive shaft rendered non-engageable by the driver after the covering cap has been secured thereon, the covering cap being non-removable from the head of the drive shaft once secured thereon without damaging the covering cap or a portion thereof.

* * * * *